(12) United States Patent
Vinciguerra et al.

(10) Patent No.: US 6,771,044 B1
(45) Date of Patent: Aug. 3, 2004

(54) ELECTRICAL POWER MANAGEMENT FOR RECHARGING MULTIPLE BATTERY-POWERED COMPUTERS

(76) Inventors: Frank A. Vinciguerra, 9 Spruce St., Sewell, NJ (US) 08080; Philip O. Post, 25 Appley Ct., Cherry Hill, NJ (US) 08002

( * ) Notice: Subject to any disclaimer, the term of this patent is extended or adjusted under 35 U.S.C. 154(b) by 176 days.

(21) Appl. No.: 10/041,150

(22) Filed: Jan. 5, 2002

Related U.S. Application Data

(60) Provisional application No. 60/267,250, filed on Feb. 8, 2001.

(51) Int. Cl.[7] .................................................. H02J 7/00
(52) U.S. Cl. ........................ 320/116; 320/124; 320/126; 320/155; 320/156
(58) Field of Search ................................ 320/124, 125, 320/126, 155, 156, 162–164

(56) References Cited

U.S. PATENT DOCUMENTS

| | | | | |
|---|---|---|---|---|
| 4,484,140 A | * | 11/1984 | Dieu | 324/434 |
| 5,701,068 A | * | 12/1997 | Baer et al. | 320/119 |
| 6,294,894 B1 | * | 9/2001 | Ochiai et al. | 320/132 |
| 6,310,460 B1 | * | 10/2001 | Takagi | 320/106 |

* cited by examiner

Primary Examiner—Bao Q. Vu
(74) Attorney, Agent, or Firm—Philip O. Post

(57) ABSTRACT

An electrical power management system is provided for effectively managing available electrical power for recharging batteries used in a plurality of battery-powered computers. The electrical power management system is of particular value when current from the available power supply is limited relative to the total charging current required for the batteries. Charging currents can be sensed to better manage the recharging process. Charging data can be sensed and recorded to optimize battery charging for a plurality of battery-powered computers.

27 Claims, 7 Drawing Sheets

ELECTRICAL POWER MANAGEMENT FOR RECHARGING MULTIPLE BATTERY-POWERED COMPUTERS

CROSS REFERENCES TO RELATED APPLICATIONS

This application claims the benefit of U.S. Provisional Application No. 60/267,250 filed Feb. 8, 2001.

FIELD OF THE INVENTION

The present invention relates to electrical power management of available electrical power for recharging internal batteries used with a plurality of battery-powered computers.

BACKGROUND OF THE INVENTION

Wireless computer networks are used in many applications, such as educational, commercial and industrial environments. A typical, basic wireless computer network consists of a server-computer and a plurality of battery-powered client-computers that all communicate via a wireless radio communication link with the server-computer through an air port antenna. The communications may be direct between a client-computer and server-computer, or between a client-computer and network access hardware that communicates with the server-computer. Typically, the client-computers are laptop or notebook style computers and are powered solely from internal rechargeable batteries. An advantage of the wireless computer network is that the portable computers can be moved about while in use without being tethered by power or data cables, as long as the portable computer is within communication range of the server-computer and is powered by a sufficiently charged battery.

Eventually, the batteries in the portable computers will need to be recharged. Depending upon the application environment, this may result in a large number of portable computers being recharged at one time. For example, in a secondary school application, a classroom populated with thirty portable computers that are used by the students during the day will all be recharged at the end of the school day. The number of portable computers that will be recharged quickly multiplies when numerous classrooms in a school utilize wireless computer networks. Thus, the power burden on the school's electrical system can be substantial when recharging commences.

In many existing buildings, the electrical distribution systems are not designed to support these significant clustered power requirements that generally occur as a result of this technology. Therefore, substantial modifications to the building's electrical distribution system are required to accommodate the clustered recharging of the batteries. Failure to properly modify the building's electrical distribution system for the recharging process can result in the tripping of circuit breakers due to circuit overloads, or can lead to potential electrical fire hazards.

For new construction, the building's electrical distribution system could be oversized to accommodate the clustered recharging of the batteries. However there are favorably time periods during a day, for example evening and early morning hours that can support recharging of the batteries without the additional construction expense of an oversized electrical system. The problem is effectively utilizing these favorably time periods for battery charging.

Therefore, there exists the need for relatively inexpensive electrical power management apparatus and method for recharging a plurality of multiple battery-powered computers.

BRIEF SUMMARY OF THE INVENTION

In one aspect, the invention is an apparatus and a method for recharging batteries used with a plurality of multiple battery-powered computers wherein the recharging process is managed on the basis of available electrical power capacity for recharging; the number of batteries to be recharged; and the time available for recharging the batteries.

These and other aspects of the invention will be apparent from the following description and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
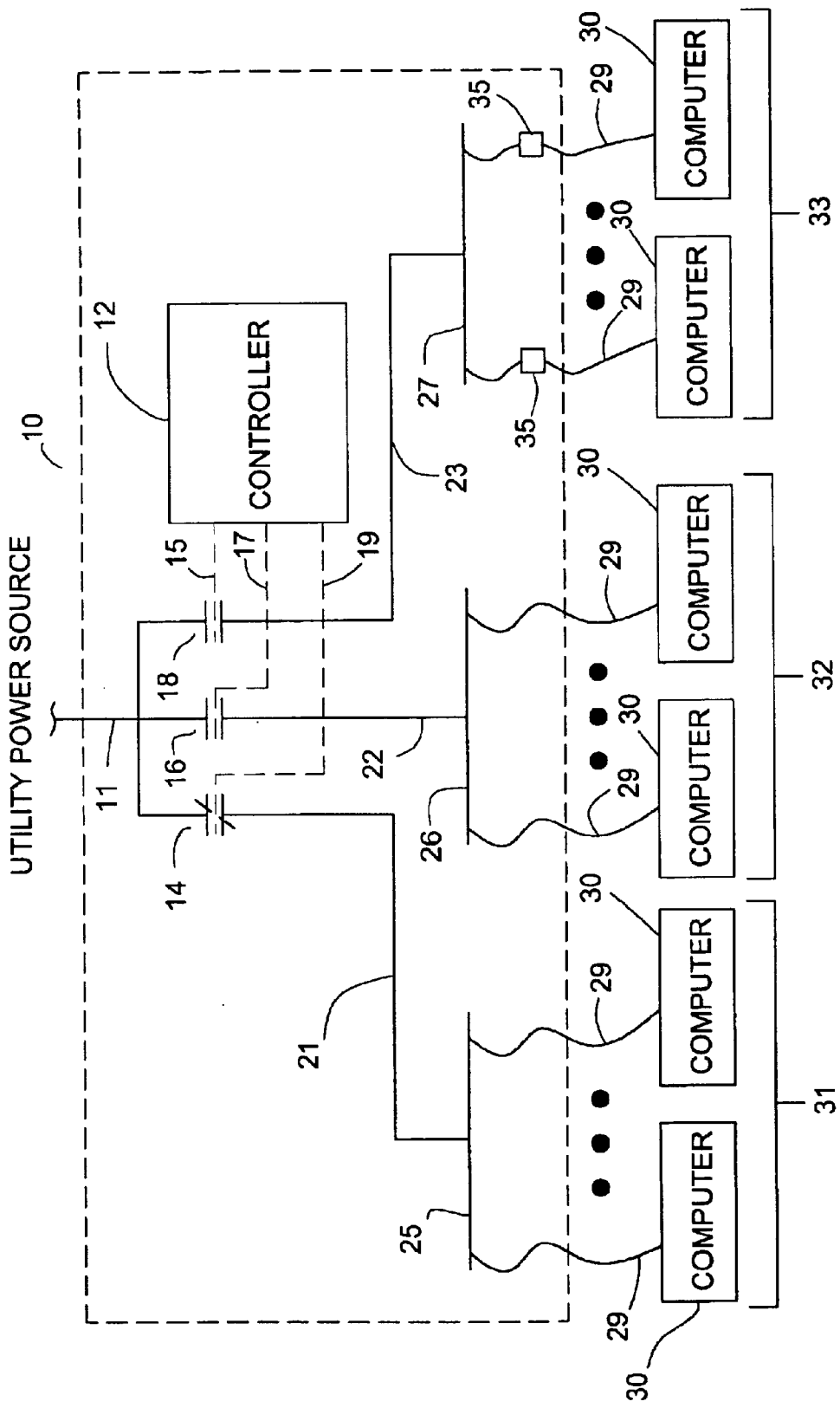
FIG. 1 is a simplified schematic of one example of an electrical power management apparatus for recharging multiple battery-powered computers in accordance with the present invention.

There is shown in FIG. 1 a first example of an electrical power management apparatus 10 of the present invention. For purposes of illustration only, and not for limiting the scope of the invention, in this example, there are thirty battery-powered computers 30 having internal batteries that require recharging. For simplification, only six of the thirty battery-powered computers are illustrated in FIG. 1. There are ten battery-powered computers in each of the three computer groups 31, 32 and 33. Designated UTILITY POWER SOURCE is typically provided by a 15- or 20-ampere rated branch circuit. While this ac power source is usually rated at 120-volts, 60 Hertz, other rated sources can be suitably converted for use with an embodiment of the electrical power management apparatus 10 of the present invention. In this illustrative example, utility ac power is provided to the line terminals of switching elements 14, 16 and 18 of apparatus 10. The switching elements may be electromechanical devices, such as relays, or suitable solid state switching devices, such as power transistors or siliconcontrolled rectifiers. Controller 12 functions as controls means for the three switching elements. Electrical conductors 21, 22 and 23 selectively provide utility power from the load terminals of switching elements 14, 16 and 18, respectively, to electrical bus elements 25, 26 and 27, respectively. Each electrical conductor 29 provides utility power from a bus element to a battery-powered computer 30. For battery-powered computers 30 that have a self-contained ac-to-dc rectifier and accept external ac power, conductor 29 may be a flexible cord with a plug that connects to the ac adapter receptacle on the battery-powered computer. Alternatively, for battery-powered computers 30 that accept external dc power, an external ac-to-dc rectifier 35 (commonly referred to as a power supply), as diagrammatically shown in FIG. 1 can be provided in series with conductor 29. Bus elements 25, 26 and 27 may be a bank of power receptacles that are selected to mate with a plug on conductor 29. In alternative examples, conductor 29 may be an electrical fitting that mates directly to a power receptacle on battery-powered computer 30.

In order to limit current drawn by the discharged batteries in computers 30, controller 12 will selectively open and close switching elements 14, 16 and 18 by control lines 15, 17 and 19, respectively. As shown in FIG. 1, switching element 14 is in the closed position to provide charging current to the ten computers in group 31 as further described below, while switching elements 16 and 18 remain open so that the twenty computers in groups 32 and 33 are not connected to utility power and are not charging. Controller 12 can be configured with timing circuit means so that switching elements 14, 16 and 18 are individually closed in rotation for a sufficient period of time to provide a substantially full recharge of the batteries in all the computer groups. Optionally, if the magnitude of current is sensed in electrical conductors 21, 22 and 23 and/or electrical conductors 29, as further described below in other examples of the invention, a combination of switching elements may be closed at the same time so long as that the total ac current drawn for battery charging by all simultaneously connected computers 30 does not exceed a pre-selected maximum current from the ac power source. By way of example, the pre-selected maximum current value can be inputted with a suitable input device (such as a keyboard interface) and simulated in a comparator circuit in the controller. The total ac current draw for battery charging can be sensed with current sensing means and inputted to the comparator circuit. If the total ac current draw does not exceed the pre-selected maximum current value, logic circuitry in controller 12 can be used to selectively open and close switching devices 14, 16 and 18. At the completion of providing a substantially full recharge of all thirty batteries in the three groups, the controller may optionally be configured with control means for closing all three switching elements so that a low-current trickle charge can be maintained to all of the batteries. Thus, all batteries in the battery-powered client-computers are recharged over a time period that is available for charging.

As disclosed above, the selection of three computer groups, with each group having ten battery-charged computers, is used simply for illustrative purposes. The number of computer groups, and therefore the number of switching elements serving the computer groups, and the number of battery-powered computers in each group will vary depending upon a particular application, and will still be within the scope of the invention.

Figure 2:
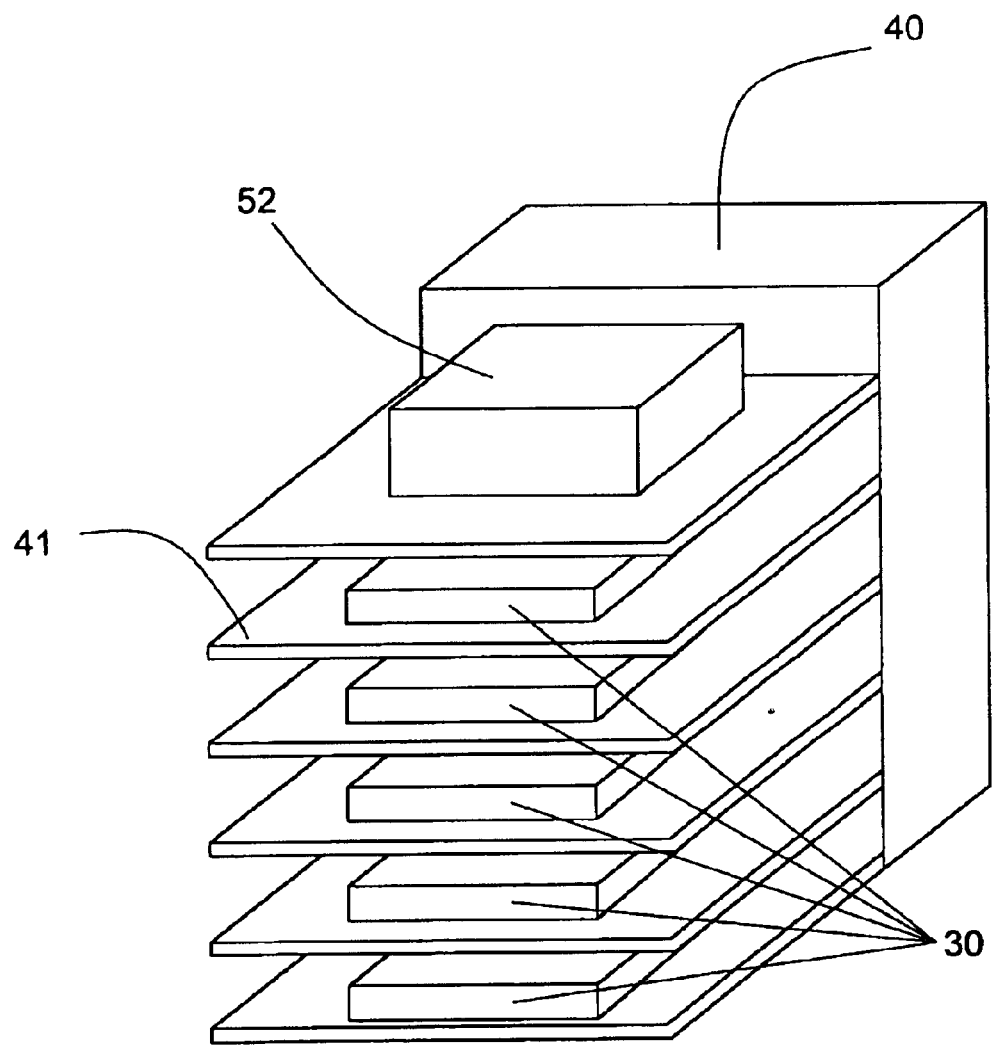
FIG. 2 is an example of one layout of an electrical power management apparatus for recharging multiple battery-powered computers in accordance with the present invention.

FIG. 2 illustrates one example of the layout of apparatus 10 relative to battery-powered computers 30. In this example, apparatus 10 is provided in an enclosure 40 that is mounted adjacent to shelves 41 for storing the battery-powered computers 30 while their internal batteries are being charged. In alternative examples, enclosure 40 may be separately wall or floor mounted. Additionally, the apparatus 10 in all examples illustrated in this specification may incorporate an ac-to-dc rectifier for direct charging of a battery when it is removed from its battery-powered computer 30. In this event, the layout would also include one or more dc battery charging receptacles that are configured for connecting to the removed batteries. One or more dc electrical bus elements would be connected to the controlled dc output of the ac-to-dc rectifier by dc switching elements that would be controlled in a power management process similar to that for the ac switching elements in the various examples in this specification. Alternatively ac switching elements could be provided at the input to the rectifier in lieu of (or in addition to) dc switching elements at the output of the rectifier. Input power to the rectifier would be from ac power line 11. A charging regulator circuit can be included with the ac-to-dc rectifier to regulate the dc output of the rectifier and provide for various charging modes, such as fast, slow or trickle charge. Additionally, apparatus 10 may incorporate one or more electrical loads with means for switching a removed battery between the load and the dc output of the rectifier. With this arrangement, one or more deep (substantially full) discharge (via the electrical load) and recharge (via dc current from the rectifier) cycles of the battery can be provided during an available charging period. This is of particular value when the types of batteries being used require occasional deep cycling to maximize battery life. If battery-operated computers 30 accept external dc power, ac-to-dc rectifiers 35 can be included in the interior of enclosure 40.

In one embodiment of the invention, the storage area for the battery-powered computers is physically isolated from the interior of enclosure 40 to provide isolation of live electrical components from individuals who would connect and disconnect computers 30 to and from apparatus 10. Power conductors 29 (either ac or dc depending upon the input configuration of computer 30) can be run through conduits between the interior of the enclosure and the storage area.

Figure 3:
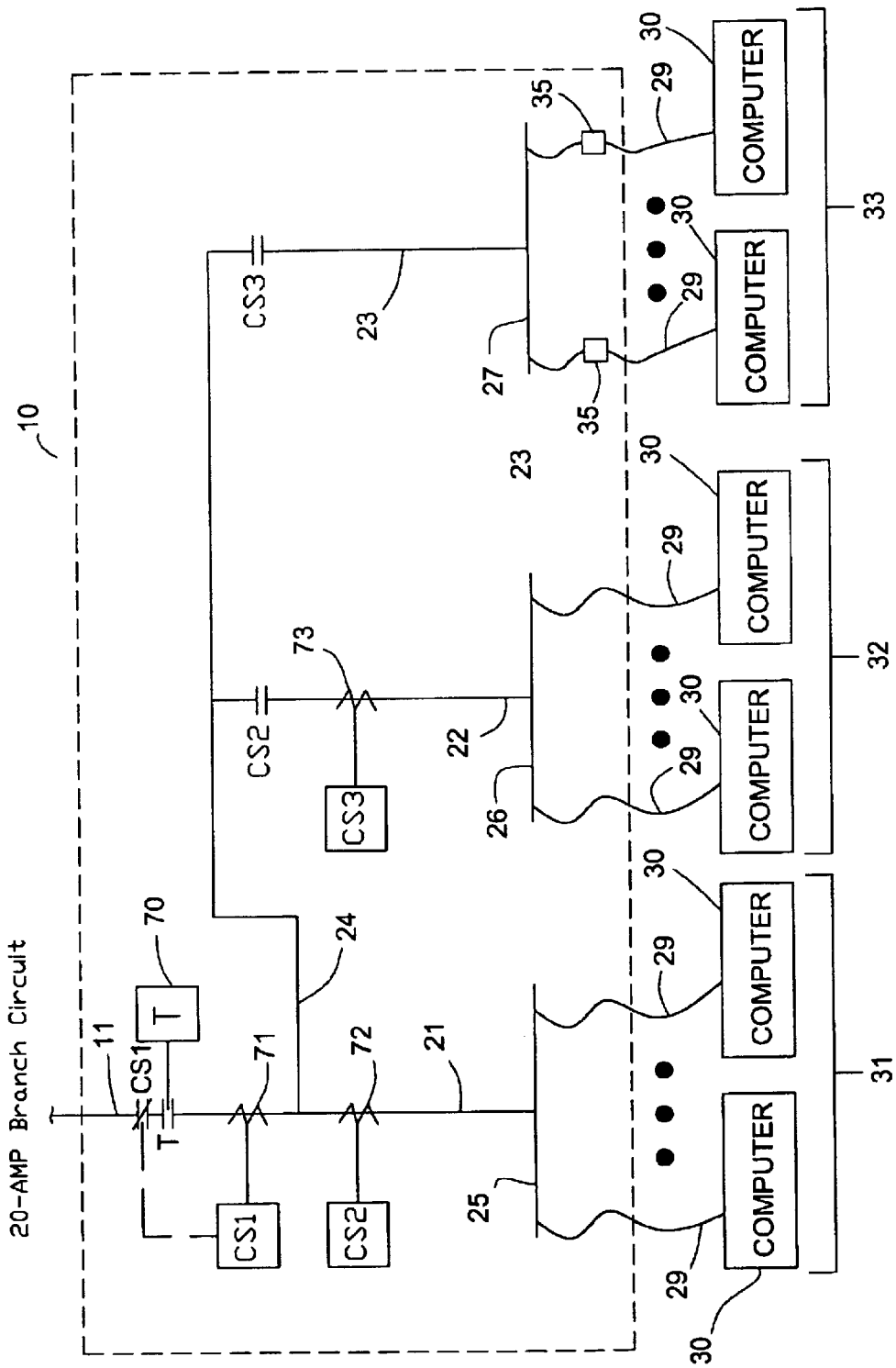
FIG. 3 is a simplified schematic of another example of an electrical power management apparatus for recharging multiple battery-powered computers in accordance with the present invention.

FIG. 3 illustrates another example of the present invention. In this example, a 20-ampere branch electrical circuit is provided to apparatus 10 from the building's utility power source. Timer 70 is, for example, a twenty-four hour timer that operates associated contacts (switching element) T. Timer 70 is selectively set to close contacts T at the time when battery recharging can be started. Timer 70 is also selectively set to open contacts T at the time after which battery recharging will no longer be allowed. Contacts (switching element) CS1 remain normally closed unless CS1 current sensor 71 (main current sensor) senses current flow in line conductor 11 that is equal to or exceeds a preset limit, such as 18 amperes, for the illustrated 20-ampere rated circuit.

As long as switching elements T and contacts CS1 are closed, the battery-powered computers 30 that are connected to electrical bus element 25 (group 31) will have their internal batteries connected to charging ac (or dc, if external ac-to-dc rectifier 35 is provided) power provided from the 20-ampere branch circuit. CS2 current sensor 72 is set to sense a first low current flow point in electrical conductor 21. For example, the CS2 low current flow point may be set at 5 amperes. When the current flowing in conductor 21 is equal to or less than 5 amperes, contacts (switching element)

CS2 will close, which will begin the charging of internal batteries for computers 30 connected to bus element 26 (group 32).

CS3 current sensor 73 is set to sense a second low current flow point in electrical conductor 22. For example, the CS3 low current flow point may be set at 5 amperes. When the current flowing in conductor 22 is equal to or less than 5 amperes, contacts (switching element) CS3 will close, which will begin the charging of internal batteries for computers 30 connected to bus element 27 (group 33).

In this charging scheme, additional groups of internal batteries begin to charge as the currently charging batteries reach full charge and the charging current that they draw is reduced. As additional groups of internal batteries are charged the previously charged batteries remained connected to the ac power source to receive a trickle charge.

The three-stage charging scheme can be expanded (or contracted to two-stages) to more stages as required for a particular application. Generalizing, any number of electrical bus elements can be provided. Battery-powered computers 30 are distributively connected to the electrical bus elements. If the computer accepts an external dc power source, in one embodiment, the ac input of an ac-to-dc rectifier 35 (commonly referred to as a power supply) is connected to the electrical bus elements and the computer is connected to the dc output of the rectifier. An electrical bus element and the connected (directly or indirectly via the rectifier) group of computers form a charging priority circuit that receives ac charging current from line conductor 11 through timer switching element T (and main switching element CS1, if used). All of the charging priority circuits are arranged and controlled so that charging begins with the batteries in the group of computers connected to a first charging priority circuit. When the charging current in the first charging priority circuit is at or falls below a selected value, charging of the batteries in the group of computers connected to the next charging priority circuit begins. This stepped process of permitting charging of the batteries in the group of computers connected to the next charging priority circuit continues until charging is accomplished in all of the charging priority circuits. Current sensing to determine when the selected value of charging current has been reached for each charging priority circuit is accomplished by a group charging current sensing device. Each group charging current sensing device is associated with a group charging current switching device that is located in the next charging priority circuit. When the selected value of charging current is achieved, the group charging current switching device closes to allow charging current in the next charging priority circuit.

Figure 4:
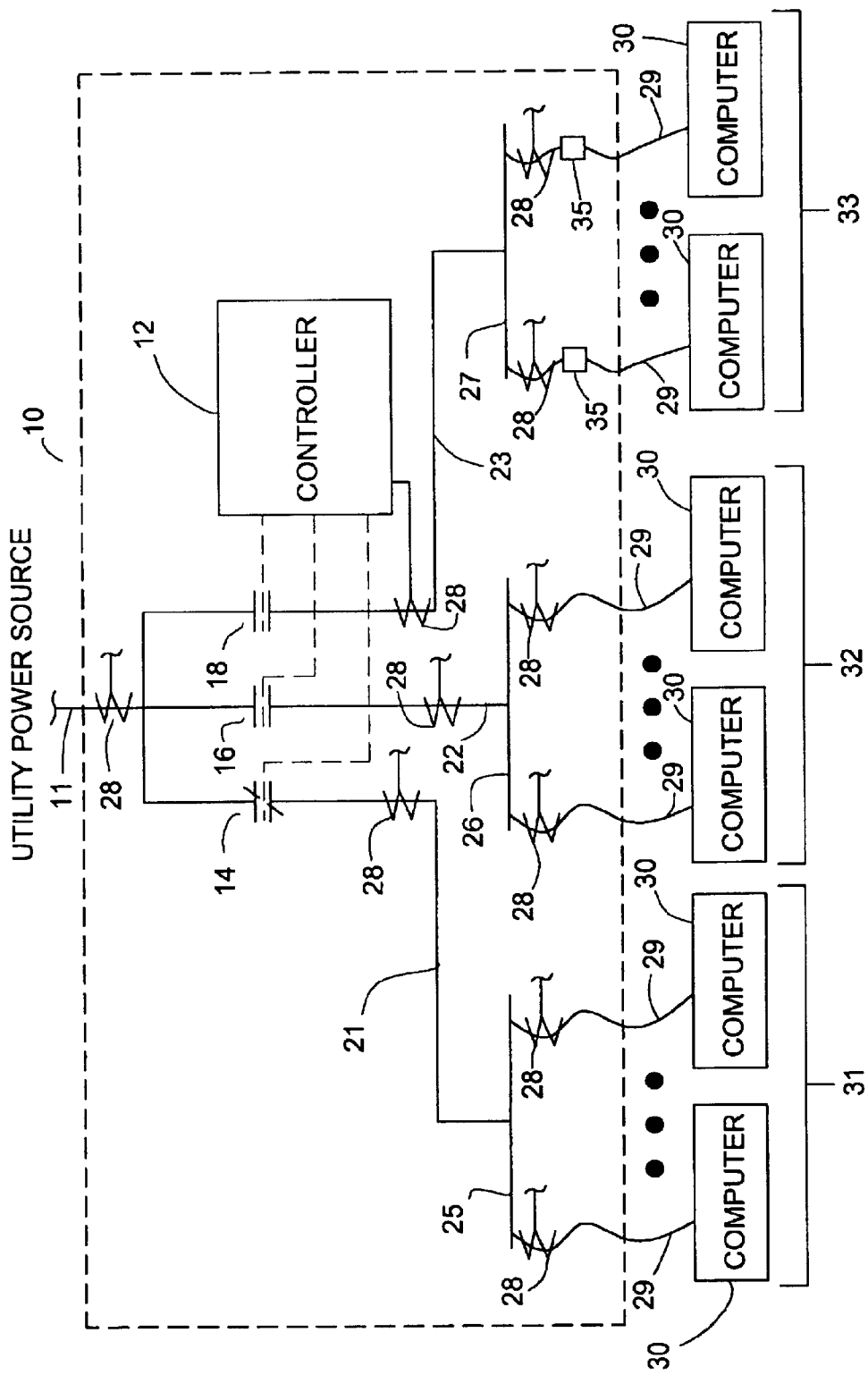
FIG. 4 is a simplified schematic of another example of an electrical power management apparatus for recharging multiple battery-powered computers in accordance with the present invention.

FIG. 4 illustrates another example of the present invention. In this example, current sensors 28 are placed in ac power line 11, and/or electrical conductors 21, 22 and 23, and/or electrical conductors 29. Each provided current sensor sends a current magnitude signal to controller 12 so that control means in controller 12 can better evaluate the present charging state of each battery-powered computer, and/or the present charging state of each computer group, and/or the total instantaneous line current draw for all computer groups. With respect to battery-operated computers 30 that accept external dc power via an external ac-to-dc rectifier as described elsewhere herein, current sensing can be accomplished at the ac input to the rectifier or the dc output of the rectifier. Monitoring these current levels will allow controller 12 to make a better evaluation of what computer groups require additional supply current that may be limited by available line power. In an arrangement where each computer group consists of only one battery-powered computer (i.e., dedicated individual computer charging control) controller 12 would be capable of high efficiency power management during the charging process by monitoring the charging rate and time, and battery charge state, of the battery or batteries in each computer. Further dedicated computer charging control in each line 29 could include a theft detection function. For example, if the current sensor in one of conductors 29 for a particular battery-powered computer senses a zero current (or alternatively, a voltage sensor sensing no computer load) condition, then the battery-powered computer has been detached from its charging conductor 29. The event could be inputted to the executing power management computer programs, as further described below in other examples of the invention, and reported via an appropriate data link to appropriate personal.

Figure 5:
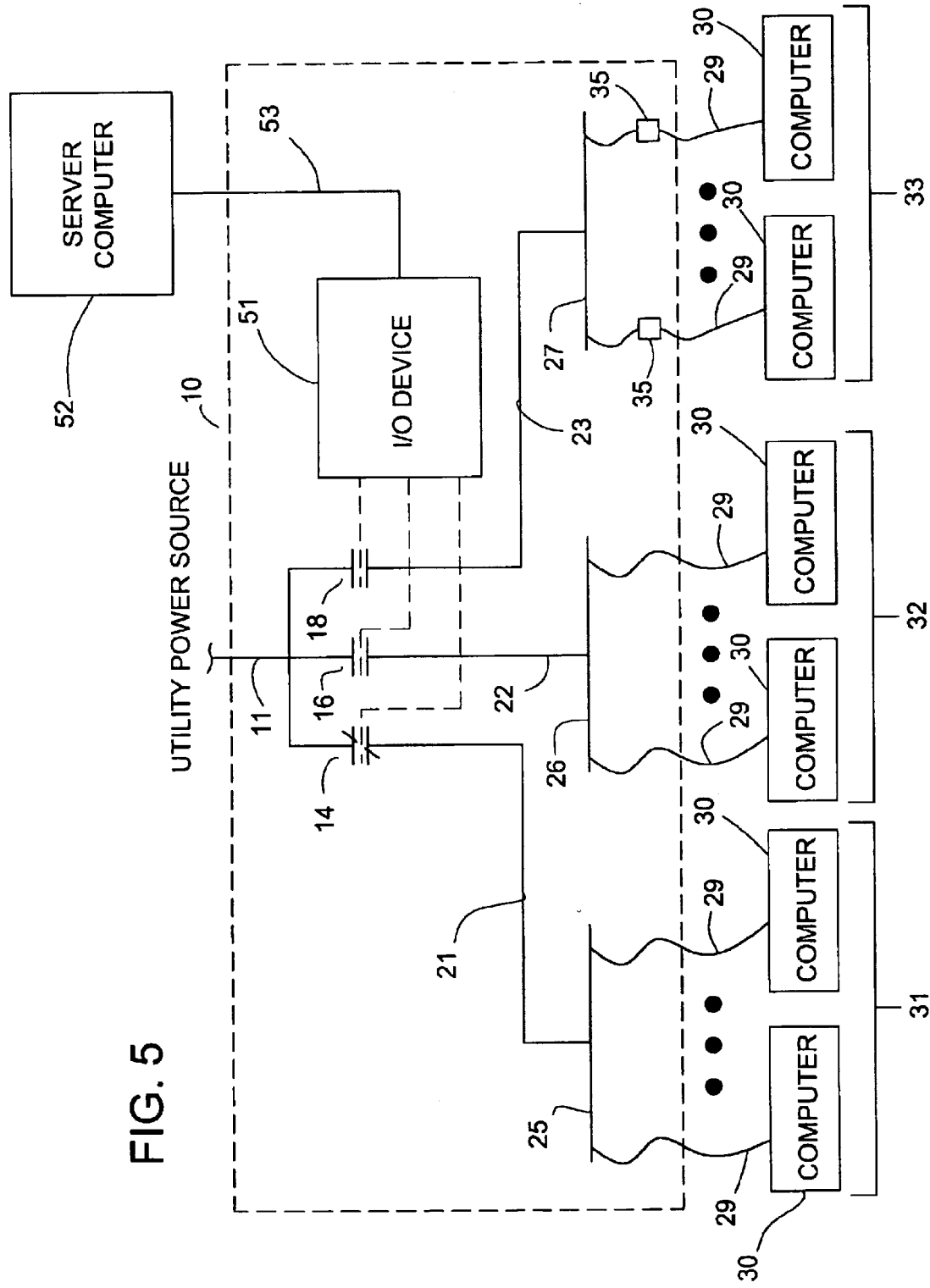
FIG. 5 is a simplified schematic of another example of an electrical power management apparatus for recharging multiple battery-powered computers in accordance with the present invention.

FIG. 5 illustrates another example of the present invention. In this example, controller 12 is replaced by an input/output (i/o) device 51 that transmits and receives data signals to/from a computer (identified as SERVER COMPUTER in the drawing) 52 via data signal line 53. Alternatively, the data communications between the i/o device 51 and computer 52 may be via wireless network devices. In this configuration, computer 52 would execute power management computer programs that would send commands (output control signals) via appropriate hardware to the i/o devices for opening and closing of switching elements 14, 16 and 18 as set forth in other examples of the invention. If current sensing is incorporated into this example of the invention, i/o device 51 could transmit sensed current levels to computer 52 wherein operating power management programs would further adjust recharging times for the batteries. With appropriate data coding for each battery-powered computer 30, the power management programs could develop a data log of each battery's charging profile and alert the operator of computer 52 regarding the present condition of a particular battery. For example, the program could determine when an end-of-life condition is approaching for a battery and recommend to the user that the battery be replaced.

Even if the batteries in all computers 30 are recharged simultaneously, a battery management computer program module for the power management programs would be an advantageous improvement. The battery management computer program module would include a database of battery parameters and be capable of tracking the service life of each battery to optimize the lifecycle performance of a battery. For example, certain types of batteries must periodically have deep cycle discharge and recharge conditioning to prolong the life of the battery. Battery discharge could be achieved by leaving computers 30 in an operating state during the available period for charging. Between deep cycle recharges by apparatus 10, the server-computer could power up computers 30 via the wireless network (i.e., run hard drive and other peripherals in computers 30) to filly discharge their internal batteries. Apparatus 10, under control of the power management programs, would manage selective discharge and recharge of computers 30 during the available charging time period. Optimal lifecycle battery performance could be maintained without user intervention.

Figure 6:
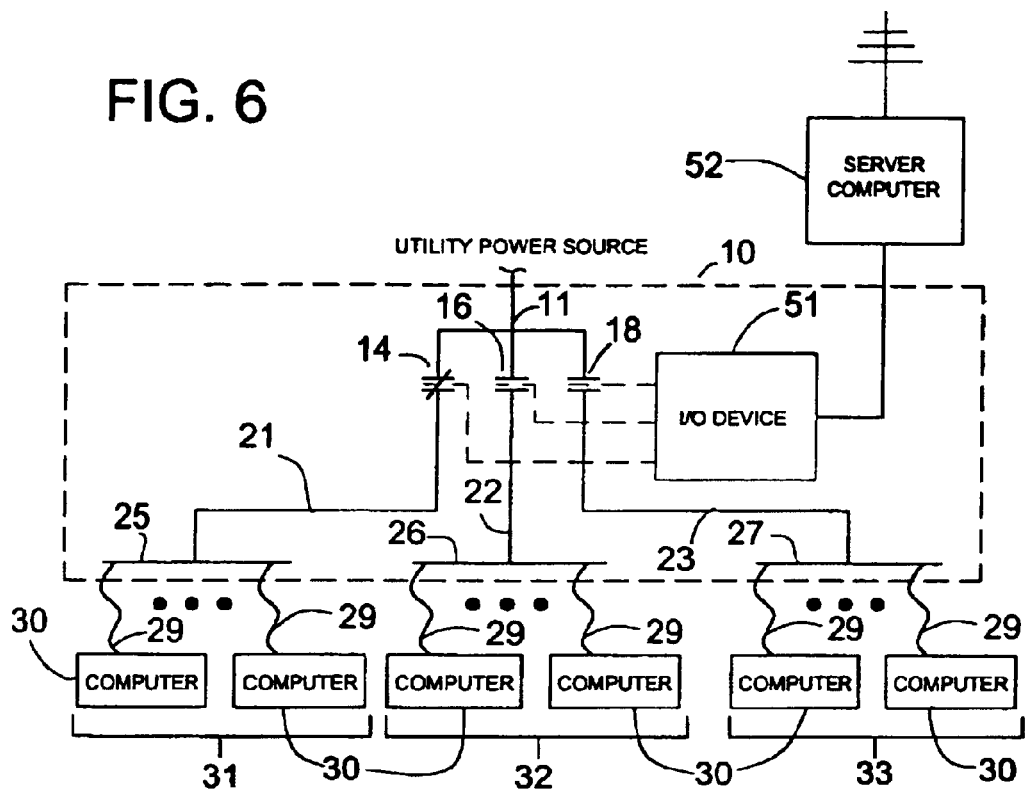
FIG. 6 is a simplified schematic of another example of an electrical power management apparatus for recharging multiple battery-powered computers in accordance with the present invention.
Figure 6:
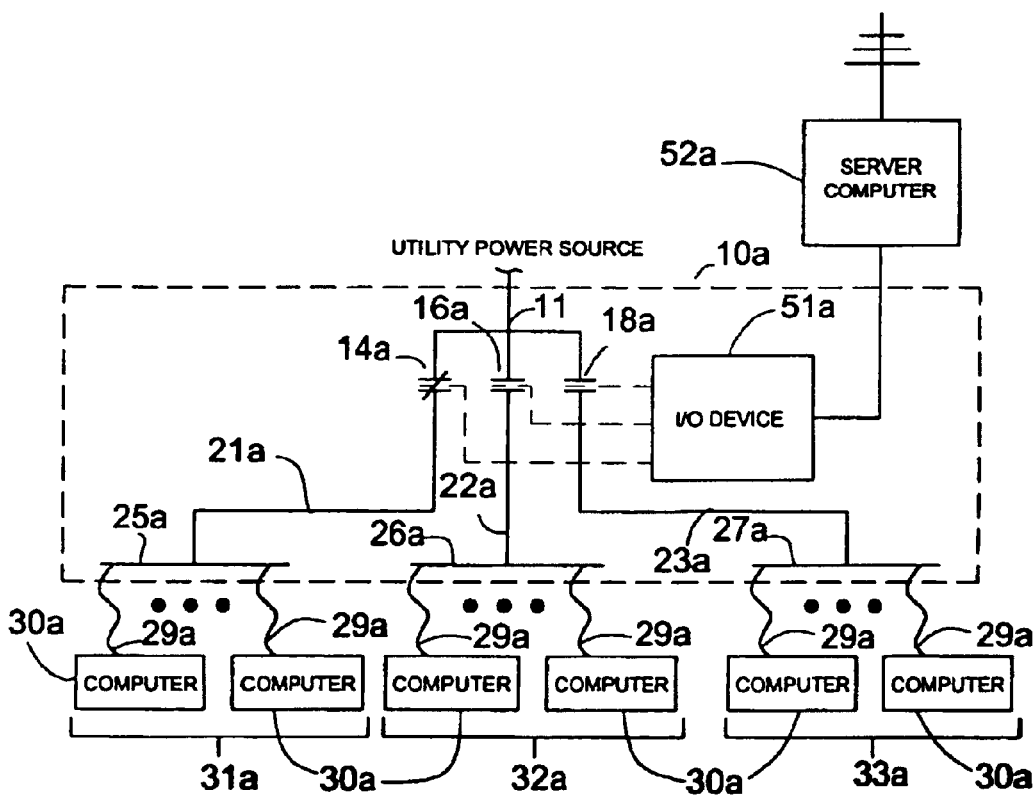

FIG. 6 illustrates another example of the present invention wherein the power management system of the present invention would be provided in multiple locations or rooms of a building, for example, a school building wherein each classroom had an apparatus 10. By way of illustration and not limitation, FIG. 6 illustrates a two-room arrangement. Computer 52 in first room is able to communicate with computer 52a in a second room by wireless communication, hard data wiring, or data signals transmitted through the building's electrical distribution system. In this example, battery charging of all battery-powered computers in the building could be efficiently scheduled throughout the available charging time period. For example, one classroom may utilize the battery-powered computers 30 for night classes, or other evening uses, after the computers have been in use all day via battery power. The power management computer programs would give charging priority to the classroom that would be used for night classes while batteries in the other classrooms are charged later in the evening.

Additionally the power management computer programs could coordinate routine client battery-powered computer program maintenance (e.g., program updates on the client computers) by the server-computer during the programmed recharging process.

Figure 7:
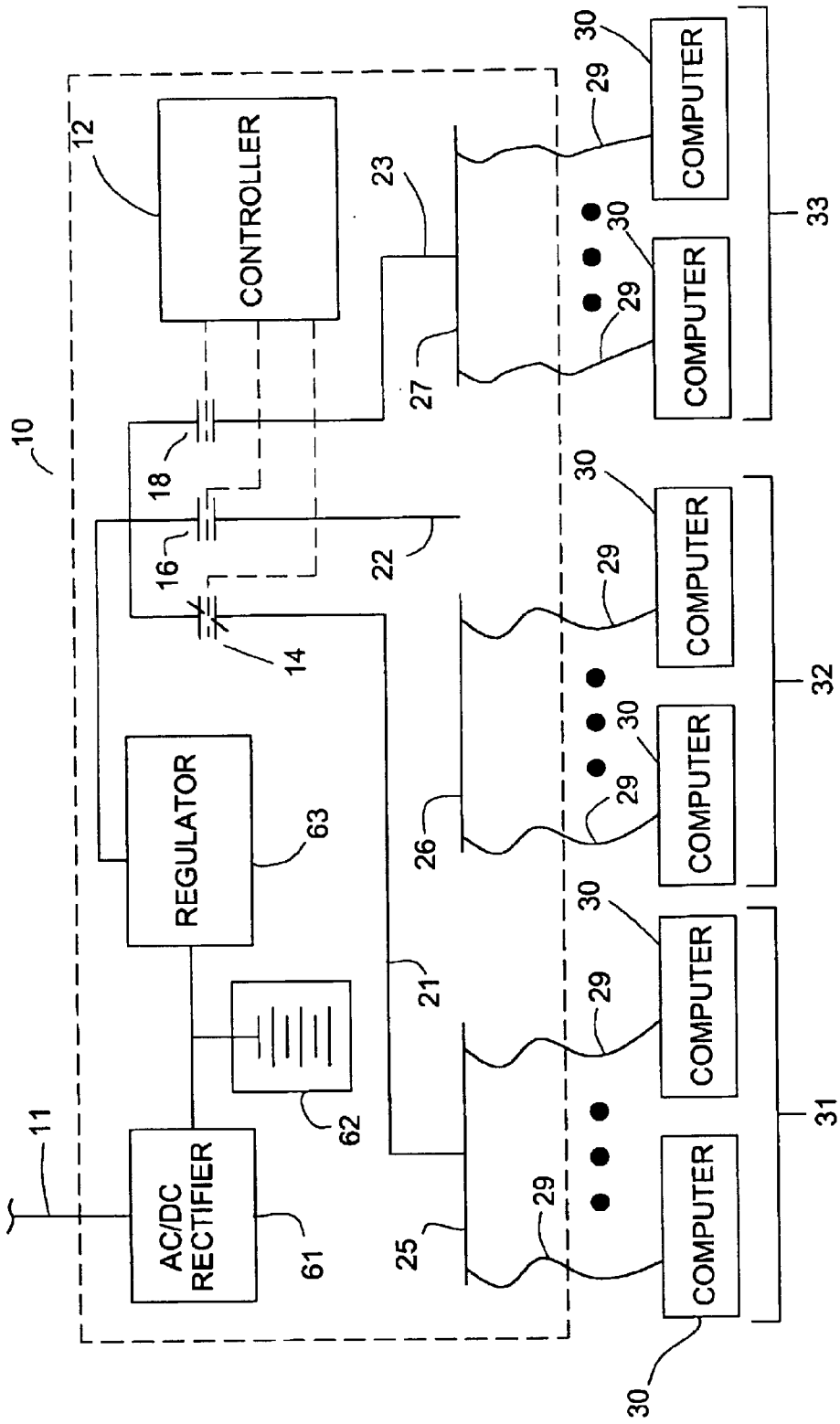
FIG. 7 is a simplified schematic of another example of an electrical power management apparatus for recharging multiple battery-powered computers in accordance with the present invention.

FIG. 7 illustrates another example of the present invention wherein apparatus 10 initially rectifies utility power in AC/DC RECTIFIER 61 and stores dc power in battery bank 62. When battery charging commences for battery-powered computers 30 that accept external dc power, battery bank 62 could supply the required dc power: In this configuration, charging power may be stored in battery 62 when convenient for the utility ac power source and selectively supplied to computer groups 31, 32 and 33 by switching elements 14, 16 and 18, respectively when charging is permissible. Alternatively, a combination of stored dc power and rectified line power can be used to charge the batteries. Regulator 63 can optionally be used to control charging parameters, such as charging voltage level and rate. In the event that battery-powered computers 30 accept external ac current, a dc-to-ac inverter can replace regulator 63. The inverter would invert dc current from battery bank 62 into an ac current that is selectively supplied to computer groups 31, 32 and 33 by switching elements 14, 16 and 18, respectively. In alternative examples of the invention, a dedicated battery bank and switching element (and supporting components, such as the regulator or inverter, if required by the configuration) may be provided for the charging of computers 30 in each computer group via their connected electrical bus element.

Ac to dc rectification, whether it is accomplished by a bulk rectifier, such as rectifier 61, or distributed rectifiers, such as rectifiers 35, or rectifiers integral to battery-operated computers 30, introduces a substantial distortion on ac power line 11. Optionally, in all examples of the invention, ac line filtering means, including active and passive filter topologies, can be included in apparatus 10 to attenuate line distortion during the charging time periods.

The power management system of the present invention may also serve as a convenient and energy efficient bulk "charging station" on an organizational-wide basis. For example, on business and university campuses, campus-wide wireless air networks are in operation. Apparatus 10 could be strategically located at various locations throughout the campus to provide centralized charging stations. This example of the invention could optionally include security locking means for computer 30 left at the station for charging and toll metering of individual computer charging. Apparatus 10 could be powered from a readily available 15- or 20-ampere building receptacle and charge many more computers 30 with a time-power management scheme than would otherwise be possible, and do so in a safe and efficient manner.

The power management system of the present invention is also applicable to an arrangement of computers 30 that are connected to apparatus 10 while they are in use. In this application, if the available utility power source is of limited capacity and cannot supply sufficient operating power to all of the computers, apparatus 10 will simultaneously operate and charge selected computer groups while the remainder of the computer groups operate solely from internal batteries that were previously charged.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa, or a switching element have a normally closed configuration can be converted to a normally open configuration by using the normally closed switching element in the power circuit of a relay or other switching element with a normally open configuration.

The foregoing embodiments do not limit the scope of the disclosed invention. The scope of the disclosed invention is covered in the appended claims.

What is claimed is:

1. An apparatus for electrical power management of the recharging of a plurality of battery-powered computers having a one or more internal batteries, the apparatus comprising:
    a plurality of electrical bus elements for connecting the plurality of battery-powered computers to the apparatus, the plurality of battery-powered computers distributively connected to the plurality of electrical bus elements to form a group of battery-powered computers connected to each one of the plurality of electrical bus elements;
    a plurality of switching elements, each one of the plurality of switching elements having a load terminal exclusively connected to one of the plurality of electrical bus elements;
    an ac power source having a limited current capacity generally less than a total maximum charging current for all of the plurality of battery-powered computers, the ac power source connected to a line terminal of each one of the plurality of switching elements; and
    a means of controlling the plurality of switching elements whereby the ac power source is selectively connected to the plurality of electrical bus elements to recharge the one or more internal batteries without exceeding the limited current capacity of the ac power source.

2. The apparatus of claim 1 wherein the means of controlling further comprises a means of exclusive sequential closure of an each one of the plurality of switching elements for a period of time sufficient to recharge the one or more internal batteries for the group of battery-powered computers connected to the each one of the plurality of switching elements.

3. The apparatus of claim 1 wherein the means of controlling further comprises a means of exclusive simultaneous closure of a two or more of the plurality of switching elements for a period of time sufficient to recharge the one or more internal batteries for the groups of battery-powered computers connected to the two or more of the plurality of switching elements.

4. The apparatus of claim 1 wherein the means of controlling further comprises an i/o device having an output to each one of the plurality of switching elements to independently open and close each one of the plurality of switching elements, the i/o device having an input from a computer whereby the computer executes a program to send commands to the i/o device to selectively open and close each one of the plurality of switching elements.

5. The apparatus of claim 1 further comprising an ac-to-dc rectifier connected between at least one of the plurality of electrical bus elements and an at least one of the plurality of battery-powered computers to supply dc current to the at least one of the plurality of battery-powered computers.

6. The apparatus of claim 1 further comprising a one or more ac-to-dc battery chargers, each of the one or more ac-to-dc battery chargers having an ac input and a dc output, the ac input of each of the one or more ac-to-dc battery chargers connected to the load terminal of an at least one of the plurality of switching elements, and the dc output of each one of the one or more ac-to-dc battery chargers connected to an at least one receptacle suitably configured to connect to and recharge a one or more batteries removed from the plurality of battery-powered computers.

7. The apparatus of claim 1 further comprising an at least one ac-to-dc rectifier having an ac input and a dc output, the ac input connected to the load terminal of an at least one of the plurality of switching elements and a dc output connected to an at least one of the plurality of electrical bus elements, whereby the at least one ac-to-dc rectifier supplies dc current to the plurality of battery-powered computers connected to the at least one of the plurality of electrical bus elements.

8. The apparatus of claim 7 further comprising a means for alternatively connecting each one of the plurality of battery-powered computers connected to the at least one of the plurality of electrical bus elements either to an electrical load or the at least one of the plurality of electrical bus elements connected to the dc output of the at least one ac-to-dc rectifier.

9. A method of recharging a plurality of battery-powered computers having a one or more internal batteries comprising the steps of:
   connecting a line terminal of a plurality of switching elements to an ac power source of a limited current capacity;
   connecting a load terminal of each one of the plurality of switching elements to one of a plurality of electrical bus elements;
   distributively connecting the plurality of battery-powered computers to the plurality of electrical bus elements; and
   controlling the plurality of switching elements to selectively supply a current from the ac power source to the plurality of electrical bus elements to recharge the one or more internal batteries for the plurality of battery-powered computers without exceeding the limited current capacity of the ac power source.

10. The method of claim 9 further comprising the step of connecting an ac-to-dc rectifier between an at least one of the plurality of electrical bus elements and an at least one of the plurality of battery-powered computers connected to the at least one of the plurality of electrical bus elements to supply dc current to the at least one of the plurality of battery-powered computers.

11. The method of claim 9 further comprising the step of sequentially closing an each one of the plurality of switching elements for a period of time sufficient to recharge the one or more internal batteries for a group of battery-powered computers connected to an each one of the plurality of electrical bus elements connected to the each one of the plurality of switching elements.

12. The method of claim 9 further comprising the step of closing at the same time two or more of the plurality of switching elements for a period of time sufficient to recharge the one or more internal batteries for a group of battery-powered computers connected to a two or more of the plurality of electrical bus elements connected to the two or more of the plurality of switching elements.

13. The method of claim 9 further comprising the following steps of:
   connecting an ac input of an ac-to-dc battery charger to an at least one of the plurality of electrical bus elements;
   connecting an at least one battery removed from the plurality of battery-powered computers to a dc output of the ac-to-dc battery charger; and
   recharging the at least one battery by the supply of dc current from the ac-to-dc rectifier.

14. The method of claim 13 further comprising the step of alternatively connecting an at least one of the plurality of battery-powered computers to either an electrical load or to the at least one of the plurality of electrical bus elements connected to the dc output of the ac-to-dc battery charger.

15. The method of claim 9 further comprising the steps of connecting an ac input of an ac-to-dc rectifier to the load terminal of one of the plurality of switching elements, and connecting a dc output of the ac-to-dc rectifier to a one of the plurality of electrical bus elements.

16. An apparatus for electrical power management of the recharging of a plurality of battery-powered computers having a one or more internal batteries, the apparatus comprising:
   an enclosure for housing:
      a plurality of electrical bus elements for distributive connection of the plurality of battery-powered computers;
      a plurality of switching elements, each one of the plurality of switching elements having a load terminal exclusively connected to each one of the plurality of electrical bus elements;
      a power terminal for connection to an external ac power source, the power terminal connected to a line terminal of each one of plurality of switching elements; and
      a one or more control devices to control the opening and closing of the plurality of switching elements; and
   a storage area for the plurality of battery-powered computers.

17. The apparatus of claim 16 wherein the storage area is physically isolated from the interior of the enclosure and a plurality of ac power conductors pass through a conduit between the interior of the enclosure and the storage area, each one of the plurality of ac power conductors connecting one of the plurality of battery-powered computers to a one of the plurality of electrical bus elements.

18. The apparatus of claim 17 further comprising a plurality of ac-to-dc rectifiers situated in the enclosure, an ac input of each of the plurality of ac-to-dc rectifiers connected to a one of the plurality of electrical bus elements; a plurality of dc power conductors passing through conduit between the interior of the enclosure and the storage area, each one of the plurality of dc power conductors connecting one of the plurality of battery-powered computers to a dc output of a one of the plurality of ac-to-dc battery chargers.

19. The apparatus of claim 16 further comprising a one or more ac-to-dc battery chargers situated in the enclosure, an ac input of each one of the one or more ac-to-dc battery chargers connected to the load terminal of an at least one of the plurality of switching elements and a dc output of each one of the one or more ac-to-dc battery chargers connected to a one or more receptacles suitably configured to connect to and recharge a one or more a batteries removed from the plurality of battery-powered computers, the one or more receptacles located external to the enclosure.

20. The apparatus of claim 16 further comprising an at least one ac-to-dc rectifier situated in the enclosure, an ac input of each at least one ac-to-dc rectifier connected to the load terminal of a one of the plurality of switching elements and a dc output of each at least one ac-to-dc rectifier connected to a one of the at least one of the plurality of electrical bus elements.

21. An apparatus for electrical power management of the recharging of a plurality of battery-powered computers having one or more internal batteries, the apparatus comprising:

a plurality of electrical bus elements for connecting the plurality of battery-powered computers to the apparatus, the plurality of battery-powered computers distributively connected to the plurality of electrical bus elements to form a group of battery-powered computers connected to each one of the plurality of electrical bus elements, the plurality of electrical bus elements arranged in two or more charging priority circuits for sequential priority charging of the plurality of battery-powered computers connected to each of the plurality of electrical bus elements;

a timer having a timer switching element controlled by the timer to close and open at selected times, the timer having a line terminal and a load terminal;

an ac power source having a limited current capacity generally less than a total maximum charging current for all of the plurality of battery-powered computers, the ac power source connected to the line terminal of the timer switching element to provide a supply current; and a plurality of group charging current sensing devices, an each one of the plurality of group charging current sensing devices controlling the opening and closing of an associated group charging current switching device, the each one of the plurality of group charging current sensing devices exclusively sensing a group charging current provided by the supply current in a one of the two or more charging priority circuits, the associated group charging current switching device disposed in a next charging priority circuit of the two or more charging priority circuits, whereby when the each one of the plurality of group charging current sensing devices senses a selected value of the group charging current that is equal to or less than the limited current capacity of the ac power, the associated group charging current switching device closes to provide the supply current to the next charging priority circuit.

22. The apparatus of claim 21 further comprising a main current sensing device associated with a main current switching element controlled by the main current sensing device, the main current sensing device connected in series with the timer switching element to sense a total connected charging current for all of the plurality of battery-powered computers, whereby the main current switching element closes when the main current sensing device senses a current at or above a selected value.

23. An apparatus for electrical power management of the recharging of a plurality of battery-powered computers having a one or more internal batteries, the apparatus comprising:

a plurality of electrical bus elements for connecting the plurality of battery-powered computers to the apparatus, the plurality of battery-powered computers distributively connected to the plurality of electrical bus elements to form a group of battery-powered computers connected to each one of the plurality of electrical bus elements;

a plurality of switching elements, each one of the plurality of switching elements having a load terminal exclusively connected to one of the plurality of electrical bus elements;

an ac power source having a limited current capacity generally less than a total maximum charging current for all of the plurality of battery-powered computers, the ac power source connected to a line terminal of each one of the plurality of switching elements;

a controller having an output to each one of the plurality of switching elements to individually open or close each one of the plurality of switching elements;

a plurality of current sensing devices, each current sensing device sensing the magnitude of a bus charging current to each one of the plurality of electrical bus elements, or the magnitude of a computer charging current from each one of the plurality of electrical bus elements to each one of the plurality of battery-powered computers, each of the plurality of current sensing devices having an input to the controller that is proportional to the sensed magnitude of the bus charging current or the computer charging current, whereby the controller processes the input from all current sensing devices and selectively opens or closes the plurality of switching elements based upon the limited current capacity of the ac power source and the sensed bus or computer charging currents so that the limited current capacity of the ac power source is not exceeded.

24. The apparatus of claim 23 further comprising a plurality of ac-to-dc rectifiers, each one of the ac-to-dc rectifiers having an ac input connected to an at least one of the plurality of electrical bus elements and a dc output connected to an at least one of the plurality of battery-powered computers to supply a dc current to the at least one of the plurality of battery-powered computers.

25. The apparatus of claim 24 further comprising a plurality of dc current sensing devices, each of the plurality of dc current sensing devices sensing the magnitude of the dc current, each of the plurality of de current sensing devices having an input to the controller that is proportional to the magnitude of the dc current to the at least one of the plurality of battery powered computers, whereby the controller processes the input from all of the plurality of current sensing devices and selectively opens or closes the plurality of switching elements based upon the limited current capacity of the ac power source, the sum of the sensed magnitude of the bus charging current to each one of the plurality of electrical bus elements, and the sum of the magnitude of the dc current to the at least one of the plurality of battery powered computers so that the limited current capacity of the ac power source is not exceeded.

26. The apparatus of claim 23 further comprising a main current sensing device, the main current sensing device sensing the magnitude of a total charging current for all of the plurality of battery-operated computers, the main current sensing device having an input to the controller that is proportional to the magnitude of the total charging current for all of the plurality of battery-operated computers, whereby the controller processes the input from the main current sensing device and opens all of the plurality of switching elements if the total charging current is equal to or greater than a selected value.

27. An apparatus for electrical power management of the recharging of a plurality of battery-powered computers having a one or more internal batteries, the apparatus comprising:

- a two or more stations for recharging the plurality of battery-powered computers, each of the two or more stations comprising:
  - a plurality of electrical bus elements for connecting a portion of the plurality of battery-powered computers to the apparatus, the portion of the plurality of battery-powered computers distributively connected to the plurality of electrical bus elements to form a group of battery-powered computers connected to each one of the plurality of electrical bus elements;
  - a plurality of switching elements, each one of the plurality of switching elements having a load terminal exclusively connected to each one of the plurality of electrical bus elements;
  - an ac power source having a limited current capacity generally less than a total maximum charging current for all of the plurality of battery-powered computers, the ac power source connected to a line terminal of each one of the plurality of switching elements;
  - a means of controlling the plurality of switching elements; and
  - a computer for executing a program to send commands to the means of controlling to selectively open and close each one of the plurality of switching elements whereby the ac power source is selectively connected to the plurality of electrical bus elements to recharge the one or more internal batteries in the plurality of battery-powered computers without exceeding the limited current capacity of the ac power source; and
- a means for communicating between the computer at each of the two or more stations, whereby recharging of the one or more internal batteries at each of the two or more stations is coordinated among all of the two or more stations.

\* \* \* \* \*